United States Patent [19]

Schneider et al.

[11] Patent Number: 4,935,220

[45] Date of Patent: Jun. 19, 1990

[54] PROCESS FOR PURIFYING CRUDE GASEOUS HYDROGEN CHLORIDE

[75] Inventors: Otto Schneider, Burghausen; Tassilo Lindner, Mehring-Öd; Wilhelm Hilgert, Burghausen, all of Fed. Rep. of Germany

[73] Assignee: Wacker-Chemie GmbH, Munich, Fed. Rep. of Germany

[21] Appl. No.: 351,506

[22] Filed: May 11, 1989

[30] Foreign Application Priority Data

May 17, 1988 [DE] Fed. Rep. of Germany ....... 3816783

[51] Int. Cl.$^5$ ............................ C01B 9/02; B01D 5/00
[52] U.S. Cl. ........................................ 423/488; 55/23; 55/71; 62/85
[58] Field of Search ...................... 423/488; 55/23, 89, 55/85, 71; 62/85, 115

[56] References Cited

U.S. PATENT DOCUMENTS 3,260,059  7/1966  Rosenberg et al. ................. 423/488
4,321,795  3/1982  Brandt et al. ............................ 55/23

FOREIGN PATENT DOCUMENTS 7110046  8/1966  Japan ..................................... 423/488
7211818  9/1971  Netherlands ......................... 423/488

*Primary Examiner*—Jeffrey E. Russel
*Assistant Examiner*—Brian M. Bolam

[57] ABSTRACT

The invention relates to a process for purifyng crude gaseous hydrogen chloride originating from plants producing silane or siloxane and containing as impurities silanes which contain chlorine and/or organic radicals, water, alkanols, hydrocarbons, chlorinated hydrocarbons, organic acids and derivatives thereof, by condensation, compression and fractional distillation. In this process, the crude gas is at least partially freed from condensable products by cooling to $-35°$ C., then compressed in a screw compressor with oil injection to 1.5 MPa, the oil is separated off, freed from gel-containing residues through a filter web and again recycled into the compressor. The compressed hydrogen chloride gas is fractionated in a distillation column under pressure and hydrogen chloride having a purity of 99.999 percent is recovered.

5 Claims, No Drawings

PROCESS FOR PURIFYING CRUDE GASEOUS HYDROGEN CHLORIDE

The present invention relates to a process for purifying crude hydrogen chloride gas and more particularly to a process for purifying gaseous hydrogen chloride containing impurities by condensation, compression and fractional distillation.

BACKGROUND OF THE INVENTION

Hydrogen chloride which is formed on a large industrial scale, for example, in chlorination reactions as a by-product usually contains impurities which interfere in its reuse. Therefore, numerous procedures for purifying hydrogen chloride are known, which, depending on the type and amount of impurities, can be used alone or in combination with other procedures [cf. "Ullmans Enzyklopädie der technischen Chemie" (Ullmans Encyclopedia of Industrial Chemistry), volume 20, 4th edition 1981, page 369 ff.].

Thus, for example, gaseous hydrogen chloride containing as impurities water and organic and/or inorganic substances, such as chlorine, chlorinated hydrocarbons, metal halides and hydrogen fluoride can be purified by a combination of different procedures (cf. DE-A 1,467,074). In this purification, the crude gas which is compressed to 0.4 MPa is cooled to about $-10°$ C. by means of a liquid coolant by counter-current contact and water and some of the impurities which are condensable under these conditions are removed. The virtually anhydrous crude gas is then compressed to 3 MPa and then contacted under pressure in a fractionating column by a counter-current process with liquid hydrogen chloride under reflux conditions. This removes impurities having a higher boiling point than hydrogen chloride in the lower part of the column, and purified hydrogen chloride is discharged at the top of the column. In the first compression stage, compressors containing concentrated sulfuric acid as sealing fluid, which acts as a drying agent and also contributes to the removal from the crude gas of any traces of water still present, are recommended. In the second compression stage, compressors of any desired construction having two or more stages and intermediate cooling can be used. Since the crude gas is virtually anhydrous, it is possible to use steel equipment not only for the second compression stage but also for the distillation under pressure, since it is essentially resistant to corrosive attacks, if the given temperature conditions are observed.

Gaseous hydrogen chloride containing as impurities volatile carbon compounds, such as hydrocarbons, chlorinated hydrocarbons and acid chlorides derived from carboxylic acids, such as phosgene, can be compressed directly as a crude gas without pretreatment and subsequently distilled, with a low-temperature condensation stage in between (cf. DE-A 2,143,994). This publication proposes to use two-or three-stage screw compressors for the compression and steel as the construction material.

The purification of hydrogen chloride formed in silane- or siloxane-producing plants and containing silanes, such as chlorosilanes, alkoxysilanes or alcohols as impurities is in general carried out by washing the gas mixture with a washing liquid, such as water (cf. DE-B 1,185,593), hydrochloric acid (cf. EP-A 114,226 and DE-A 3,533,577) or sulfuric acid (cf. DD-A 227,685). The more or less dilute acids formed in this process as by-products have to be concentrated by additional measures or disposed of by other means, since their reuse for synthetic purposes is very limited.

Since in a large chemical plant, crude gases containing hydrogen chloride usually originate from different synthetic areas and thus contain different impurities, it makes sense, for reasons of economics and environmental protection, to find a common process for their purification or processing.

Crude gaseous hydrogen chloride is formed, for example, in silane-producing or processing plants, such as in the preparation of silanes containing phenyl or phenylmethyl groups by reaction of H-silanes with chlorobenzene, the preparation of tetraethoxysilane by reaction of silicon tetrachloride with ethanol, the preparation of organoalkoxysilanes by reaction of organochlorosilanes with alkanols, such as methanol and ethanol, in which the corresponding alkyl chloride is formed as a by-product, and the preparation of organoacyloxysilanes by reaction of chlorosilanes with carboxylic acids, such as acetic acid, in which the corresponding acyl chloride, such as acetyl chloride, and acetic anydride are formed as by-products.

The crude gases which are formed therefore also contain, in addition to the starting materials and final products of the paricular reaction, the by-products which are formed in the reaction, and also water and any organic solvents which may have been used, such as ethyl acetate, acetone, toluene and xylene, just to mention the most important ones.

The type of potential impurities in the crude gas can be illustrated in more detail by the following examples: In the preparation of methyltriethoxysilane by reaction of methyltrichlorosilane with ethanol according to the equation $$MeSiCl_3 + 3EtOH \rightarrow MeSi(OEt)_3 + 3HCl \tag{1}$$

the resultant crude hydrogen chloride gas additionally contains, in addition to the starting materials and the final product, hydrocarbons which are present in ethanol as denaturants (about 2 percent) and ethyl chloride, which is formed in a side reaction according to the equation $$EtOH + HCl \rightarrow EtCl + H_2O \tag{2}$$

In addition, mixed chloroethoxysilanes are present which can react with excess hydrogen chloride with the elimination of ethanol according to the equation $$MeSiCl_{3-x}(OEt)_x + y\ HCl \rightleftharpoons MeSiCl_{3-x+y}(OEt)_{x-y} + y\ EtOH \tag{3}$$

($x=0$, 1, 2, or 3 and $y<x$) and the water of the reaction formed according to equation (2) can form gel-like methylsilicic acids with the mixed chloroethoxysilanes catalyzed by HCl according to the equation $$n.MeSiCl_{3-x}(OEt)_x + n.1.5H_2O \Delta (MeSiO_{1.5})_n + n.(3-x)\ HCl + n.x\ EtOH. \tag{4}$$

Therefore, it is an object of the present invention to provide a process for purifying crude gaseous hydrogen chloride containing impurities. Still another object of the present invention is to purify crude gaseous hydrogen chloride containing impurities such as silanes containing chlorine and/or organic radicals, water alkanols, hydrocarbons, chlorinated hydrocarbons, organic acids and derivatives thereof. A further object of the present invention is to provide a process for purifying crude gaseous hydrogen chloride containing impurities by a combination of procedures consisting of condensation, compression and fractional distillation.

SUMMARY OF THE INVENTION

The foregoing objects and others which will become apparent from the following description are acomplished in accordance with this invention, generally speaking, by providing a process for purifying crude gaseous hydrogen chloride which comprises (1) passing the crude gas through a heat exchanger, which it is cooled to −15° C. to −35° C., (2) subsequently heating the crude gas which has been at least partially freed from condensable products to 0° C. to +40° C., compressing it in a screw compressor with oil injection to a pressure of 0.6 to 1.5 MPa, separating off the hydrogen chloride from the oil through a separator having a filter, cooling the oil which has been separated off in a heat exchanger, freeing it from residues through a filter web, and recycling it into the compressor, and thereafter (3) subsequently fractionating the compressed hydrogen chloride which has been separated off from the oil in a distillation column equipped with a condenser and under pressure and discharging the purified hydrogen chloride at the top of the column.

DESCRIPTION OF THE INVENTION

When the purification process of this invention is carried out, the crude gas containing hydrogen chloride is subjected in a first process stage to low-temperature condensation. For this purpose, the crude gas which gas which is usually present at a termperature of more than −15° C. and a pressure of 0.08 to 0.15 MPa is passed through a corrosion-resistant heat exchanger and thereby cooled to −15° C. to −35° C., preferably to −25° C. to −35° C. The components which are liquified in this temperature range, in paticular water and alkanols, in addition to silanes, hydrocarbons and chlorinated hydrocarbons, are collected and discharged. The crude gas which is thus at least partially freed from these products exits from the exchanger.

After exiting from the heat exchanger, the prepurified crude gas is heated to about 0° C. to +40° C., preferably to about ambient temparture (for example −10° C. to +25° C.) and introduced into the compressor.

Compressors which are suitable are in particular single-stage screw compressors with oil injection, which achieve a maxium compressin pressure of up to 2.0 MPa, preferably of at least 0.6 to 1.5 MPa and in particular of from 0.8 to 1.2 MPa in a single-stage compression. For mounting the two horizontal rotors, bearing made of carbon steel are used. Carbon steel means a non-alloy steel which, except for permissible admixtures, does not contain any special alloy additives except carbon.

The oil which exits the compressor together with the compressed gas at a temperature of from about 60° C. to 110° C., is then separated from the gas stream in a separator. It is then cooled in a subsequent heat exchanger, and subsequently freed from residues through a filter web and recycled into the compressor, for example on the suction side.

Additive-free polyolefein-based synthetic hydrocarbons are particularly suitable for the oil lubrication in the screw compressor. Filter webs made of polymeric organic material, such as filter webs made from polypropylene having a porosity of 10μm, have proven to be suitable as filter webs for removing in particular gel-like residues, such as gel-like alkylsilicic acids, which are formed, for example, according to equation (4).

The compressed gas is freed from residual oil components through a second separator having a filter, preferably a ceramic filter, and is then fractionated in a distillation column under pressure.

By means of the purification process of this invention, virtually all impurities which at atmospheric pressure (0.1013 MPa) have a boiling point of 35° C. to +200° C., in particular those having a boiling point of 0° C. to +150° C., can be removed from crude hydrogen chloride gas which is obtained from different processes.

EXAMPLE

About 38 kg/h of a crude gas containing hydrogen chloride, which was obtained from the preparation of methyltrimethoxysilane from methyltrichlorosilane and methanol having 3.4 percent by weight of impurities, were passed at a temperature of 20° C. and a pressure of 0.11 MPa through a tubular heat exchanger and thereby cooled to −35° C. The condensate formed was collected and discharged. After leaving the heat exchanger, the crude gas freed from the condensate was warmed to +18° C. and introduced into the compressor at a slight over-atmospheric pressure (0.10 MPa absolute). The compressor used was a single-stage screw compressor with oil injection (additive-free synthetic hydrocarbons commercially available under the name of SHF Base Stock Oil from Mobil Oil Co.). After the compression, the gas/oil mixture had a temperature of +89° C. The oil was separated from the gas stream in a separator, cooled in a subsequent heat exchanger (exchange area 1 m$^2$), then filtered through a filter web made of polypropylene having a porosity of 10μm (filter area 0.17 m$^2$) and recycled into the compressor on the suction side at a temperature of 62° C. After more than 4000 hours of operation, the compressor showed no damage due to corrosion.

The compressed gas was freed from the residual oil components through a second separator having a ceramic filter and introduced at a temperature of 87° C. under a pressure of 1.15 MPa into a pressure distillation column equipped with a condenser. The column used was a packed column having a height of 5 m and a diameter of 100 mm. Berl saddles made of ceramic were used as the packing material; the packing height was 3.5 m.

The compressed crude gas was fed at a rate of 38 kg/h directly above the bottom of the column the reflux was 76 kg/h (HCl liquid at the top of the column) corresponding to a reflux ratio of 2:1; the pressure in the column was 1.15 MPa (absolute), the temperature at the top of the column −35° C. and at the bottom of the column about +70° C. The hydrogen chloride discharged at the top of the column as a liquid had a purity of 99.999 percent, which corresponds to less than 10 ppm of impurities.

What is claimed is:

1. A process for the purification of crude gaseous hydrogen chloride which contains as impurities silanes containing chlorine and/or organic radical, alkanols, water, chlorinated hydrocarbons, hydrocarbons, and organic acids, by condensation, compression and fractional distillation, which comprises (1) passing the crude gas through a heat exchanger, in which it is cooled to −15° C. to −35° C.; (2) subsequently heating the crude gas which has been at least partially freed from condensable products to 0° to −40° C., compressing it in a screw compressor with oil injection to a pressure of 0.6 to 1.5 MPa, separating off the hydrogen chloride from the oil through a separator having a filter, cooling the oil which has been separated off in a heat exchanger, freeing it from residues through a filter web, and recycling it to the compressor; and (3) subsequently fractionating the compressed hydrogen chloride which has been separated from the oil in a distillation column under pressure and discharging the purified hydrogen chloride at the top of the column.

2. The process of claim 1, wherein the crude gas in the first process stage is passed through a corrosion-resistant heat exchanger and cooled to −25° C. to −35° C.

3. The process of claim 1, wherein the crude gas which is at least partially freed from condensable products in the second process stage is heated to +10° C. to −25° C., compressed in a single-stage screw compressor with oil injection to a pressure of 0.8 to 1.2 MPa, the hydrogen chloride in separated from the oil through a separator having a ceramic filter and the oil which has been separated off is filtered through a filter web of polymeric organic material.

4. The process of claim 3, wherein additive-free polyolefin-based synthetic hydrocarbons are used for the oil lubrication of the screw compressor used in the second process stage.

5. The process of claim 1, wherein the compressed hydrogen chloride in the third process stage is fractionated under pressure in a distillation column equipped with a condenser and the purified hydrogen chloride is discharged at the top of the column as a liquid.

* * * * *